United States Patent [19]

Quin et al.

[11] Patent Number: 4,506,863

[45] Date of Patent: Mar. 26, 1985

[54] AUTOMATIC HYDRAULIC CONNECTORS

[75] Inventors: René A. Quin, Harskirchen, France; Paul Wiet, Randaberg, Norway; Jean-Louis Migliarese-Caputi, Paris, France

[73] Assignee: Compagnie Francaise des Petroles, Paris, France

[21] Appl. No.: 564,065

[22] Filed: Dec. 21, 1983

[30] Foreign Application Priority Data

Dec. 22, 1982 [FR] France ................................ 82 21525

[51] Int. Cl.³ ........................ F16L 29/00; F16L 37/28
[52] U.S. Cl. .............................. 251/149.9; 137/614.2; 285/316; 285/DIG. 21; 141/349
[58] Field of Search ...................... 137/614.05, 614.06, 137/614.2; 251/89.5, 148, 149, 149.8, 149.9, 144; 285/82, 306, 316, DIG. 21; 141/346, 349

[56] References Cited

U.S. PATENT DOCUMENTS

| | | | |
|---|---|---|---|
| 2,887,124 | 5/1959 | Mehl | 137/614.06 |
| 2,959,024 | 11/1960 | Echert et al. | 137/614.06 X |
| 3,122,263 | 2/1964 | Guiver | 285/306 X |
| 3,135,417 | 6/1964 | Gardiner et al. | 285/306 X |
| 3,193,308 | 7/1965 | Todd | 285/306 X |
| 3,847,413 | 11/1974 | Gurley et al. | 285/DIG. 21 X |
| 4,354,523 | 10/1982 | Hochmuth et al. | 137/614.2 X |

Primary Examiner—A. Michael Chambers
Assistant Examiner—John C. Fox
Attorney, Agent, or Firm—Sughrue, Mion, Zinn, Macpeak and Seas

[57] ABSTRACT

An automatic hydraulic connector for connecting an hydraulic pipe to apparatus comprises a female cylindrical receptacle for connection to the apparatus and a retractable hollow male cylindrical body releasably lockable by locking means to the receptacle, under the control of a cylindrical slide member biased by a spring to its locking position and driven into its unlocking position by the action of an operating fluid which acts on a movable cylindrical core which is connectable to the slide member and also in part defines the hydraulic passage extending from an inlet in the male body to an outlet in the female receptacle.

8 Claims, 1 Drawing Figure

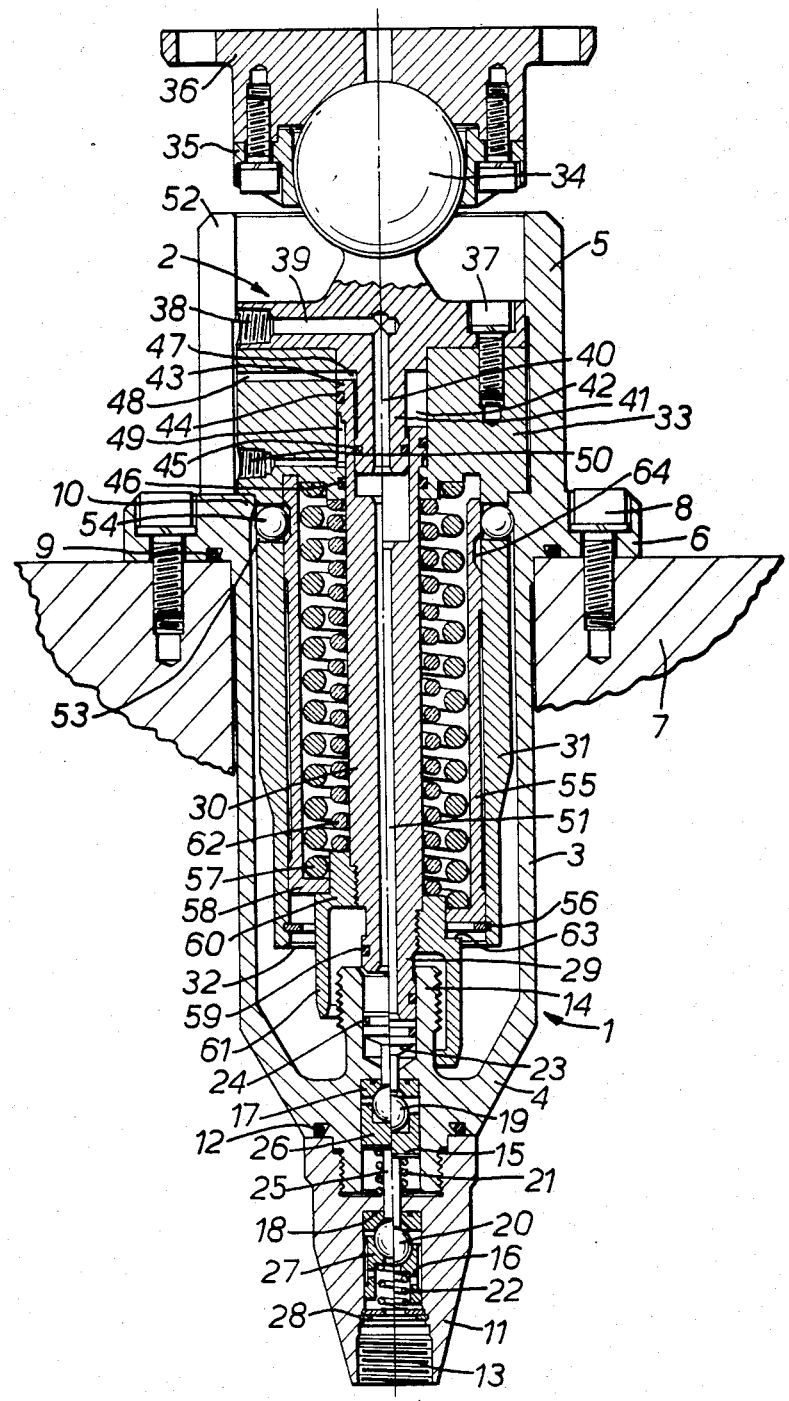

AUTOMATIC HYDRAULIC CONNECTORS

The present invention relates to an hydraulic connector capable of being connected and/or disconnected automatically without the intervention of an operator at the site of the connector.

A connector of this kind is particularly but not exclusively useful for delivering a compressed fluid to a submerged apparatus, and specifically for delivering a compressed fluid to an inflatable obturator when a repair has to be made on a submerged pipe.

In this last-mentioned case it may in addition be helpful to have means for deflating the obturator.

According to the present invention, there is provided an hydraulic connector for connecting an apparatus to a hydraulic pipe comprising a first fixed part provided with connecting means for connecting it to the apparatus and with a first internal passage extending through the first part, and a second retractable part provided with locking means for locking it to the first part and with a second internal passage connected, at a first end of the second part, to connection means for connection to the hydraulic pipe, and adapted, at a second end of the second part, to be brought into communication with the first internal passage, wherein the first part comprises a female cylindrical receptacle having an end piece provided with an axial neck directed inwardly of the receptacle and providing in part the first internal passage, the second part comprises a hollow male cylindrical body adapted to be introduced into the cylindrical receptacle and including a cylindrical slide member which is axially slidable and is urged axially by a main resilient member in the direction of the second end of the said second part towards a locking position in which it locks the locking means, and the second internal passage is partly provided by a movable hollow cylindrical core having a first axial end which is associated with an operating chamber for receiving an operating fluid for the axial displacement of the said movable cylindrical core, and a second axial end which is provided with fluid-tight engagement means for engagement with the axial neck, the operating chamber is arranged to cause displacement of the cylindrical core in a disconnection direction from the second end towards the first end of the second part, and the second axial end of the cylindrical core is provided with drive means for driving the cylindrical slide member on displacement of the movable cylindrical core in the disconnection direction, to cause the cylindrical slide member to move out of its locking position.

Thus, introduction of operating fluid into the operating chamber may bring about at the same time the disconnection of the cylindrical core from the axial neck and the unlocking of the male hollow cylindrical body from the female cylindrical receptacle to enable withdrawal of the male hollow cylindrical body from the female receptacle.

The movable cylindrical core may be urged axially by an auxiliary resilient member in the opposite direction to the said disconnection direction, towards an advanced position in which the drive means are separated from the cylindrical slide member, while the latter, which is then in the locking position, is retained against further axial movement by a stop. Thus, the hydraulic connection and the mechanical locking of the connector may be made independent of one another and it is possible, by supplying first operating fluid under reduced pressure to the said operating chamber, to effect in a first stage the simple disconnection of the cylindrical core from the axial neck and optionally to effect certain checks before proceeding, in a second stage, to unlock the hollow male cylindrical body from the female cylindrical receptacle by supplying to the operating chamber an operating fluid under a higher pressure.

At least one non-return valve may be installed in the first internal passage in the female cylindrical receptacle, the valve being associated with a movable intermediate member so disposed as to be displaced by the second axial end of the movable cylindrical core on engagement of that end with the axial neck, and in turn to displace the non-return valve to its open position. The non-return valve may remain open as long as the movable cylindrical core is in engagement with the axial neck, so that compressed fluid can be withdrawn from the apparatus.

An embodiment according to the invention will now be described, by way of example only, with reference to the accompanying drawing.

In the drawing, the single FIGURE shows an embodiment of a hydraulic connector according to the invention in axial section.

The hydraulic connector shown in the drawing comprises a cylindrical female receptacle 1 and a hollow male cylindrical body 2.

The cylindrical receptacle 1 comprises a central tubular portion 3 open at a first axial end and closed at a second axial end by an end piece 4. At the first axial end, the tubular portion 3 is extended by a tubular guide 5 and carries a flange 6 for connection to apparatus 7, of which only a very small part of the casing is shown, for example by means of threaded bolts 8, a seal ring 9 being interposed between the flange 6 and the casing of the apparatus 7. Tubular portion 3 is also provided, at its first end, with a shoulder 10 which is engaged by locking means for locking the hollow cylindrical body 2 relative to the cylindrical receptacle 1, as will be described hereafter.

The end piece 4 is extended by a nose 11 screwed onto the end piece 4 with the interposition of a seal ring 12. Inside the assembly comprising the end piece 4 and the nose 11 a first axial internal passage 13 is provided, which opens at one end in an internal neck 14 within the receptacle 1. The neck 14 is provided with an external screwthread and the free end of the nose 11 is provided with an internal screwthread permitting the fitting of protective stoppers. The passage 13 is provided with two non-return valves 15 and 16 disposed in series and providing redundant security for maintaining within the apparatus 7 a compressed fluid introduced through the passage 13.

The non-return valves 15 and 16 each comprise a seat 17 and 18 respectively, a closure ball 19 and 20 respectively and a spring 21 and 22 respectively, which applies the ball against its seat. A movable hollow intermediate member 23 in the form of a funnel is slidable in the passage 13, supported against the wall of the passage by a ring 24, and holds the ball 19 away from its seat 17 when the hollow male cylindrical body 2 is in a connected condition. Another movable hollow intermediate member 25 is disposed between the balls 19 and 20 to move the ball 20 from its seat 18 when the ball 19 is itself off its seat 17. The balls 19 and 20 are retained by slidable guides 26 and 27 respectively, which are acted on by the springs 21 and 22 respectively. The spring 21 bears against the nose 11, while the spring 22 bears against a retaining ring 28 through the medium of a washer.

The left-hand half of the FIGURE shows a non-connected and unlocked position of the hollow male cylindrical body 2, while the right-hand half of the FIGURE shows the connected and locked position of the body 2. It can be seen that these two positions of the body 2 correspond respectively to a closed position of the non-return valves 15 and 16 and to the open position of the valves 15, 16. In the open position of the valves 15, 16, the member 23 is abutted and moved by one axial end 29, referred to as the second axial end, of a movable hollow axial cylindrical core 30 carried by the hollow male cylindrical body 2.

The hollow male cylindrical body 2 comprises a tubular casing 31 open at a first axial end 32 and closed at its second axial end by a thick cylindrical cover 33 ending in a spherical head 34, on which a bearing 35 is mounted to form a ball joint. The bearing 35 is fixed on a flange 36 attached to a handling member (not shown).

The cover 33 projects radially from the tubular casing 31 and comes to bear against the flange 6 which thus determines the axial position of the hollow cylindrical body 2 in the cylindrical receptacle 1. The body 2 is centered in the receptacle 1 through the engagement of the cover 33 in the tubular guide 5.

The cover 33, comprising two parts joined together by threaded bolts 37, is provided with connection means 38 for connection to a hydraulic pipe (not shown) carried by the handling member and for hydraulic connection to the first internal passage 13 in the cylindrical receptacle 1. The connection means 38 communicates by way of a radial duct 39 with an axial duct 40 formed in a fixed cylindrical core 41 of the cover 33. Around the fixed cylindrical core 41 there is an annular cylindrical space 42, in which an annular piston 43 is slidable, sealing being effected by annular seals 44, 45 and 46. The cross-sectional area of the fixed cylindrical core 41 is substantially equal to the cross-sectional area of the movable cylindrical core 30 at its second end 29. The piston 43 divides the space 42 into a passive chamber 47 in communication with a vent 48, and an active operating chamber 49 adapted to receive an operating fluid through an inlet 50 connected to a pipe (not shown) carried by the handling member. The piston 43 is mechanically connected by a tubular portion to the other or first axial end of the movable cylindrical core 30, in which a central duct 51 is provided forming, with the axial duct 40, a second internal passage in the male hollow cylindrical body 2 and for connection to the first internal passage 13 situated in the female cylindrical receptacle 1.

A longitudinal opening 52 is provided in the tubular guide 5 to permit the passage of the pipes connected to the connection means 38 and to the inlet 50, on the introduction of the hollow cylindrical body 2 into the cylindrical receptacle 1.

The tubular casing 31 is provided with holes 53, receiving balls 54, and so situated that, when the hollow cylindrical body 2 is in position in the cylindrical receptacle 1, the balls 54 are located opposite the central tubular portion 3 just below the shoulder 10. A cylindrical slide member 55 is slidable inside the tubular casing 31 between a locking and an unlocking position. In its locking position it pushes the balls 54 radially outwardly to the locking position and bears against a retaining ring 56 carried by the casing 31. The locking position is the natural position assumed by the cylindrical slide member 55 through the action of a main compression spring 57 bearing against the cover 33 and against an annular portion 58 of the cylindrical slide member 55.

The second axial end 29 of the movable cylindrical core 30 is arranged to penetrate into the internal neck 14 of the cylindrical receptacle 1 and to be engaged sealingly therein with the aid of an annular seal 59. The first axial end of the movable cylindrical core 30 slides externally along the fixed cylindrical core 41, while the second axial end 29 thereof is engaged internally in the neck 14.

Towards the second axial end 29, the cylindrical core 30 is also provided with a ring 60 screwed thereon and which is extended by a hood 61 protecting the second axial end 29. An auxiliary compression spring 62 bears against the cover 33 and against the ring 60. The movement of the ring 60 which is defined by the displacement of the piston 43 between the axial ends of the cylindrical annular space 42, is greater than the movement of the cylindrical slide member 55 whose movement is limited by the retaining ring 56. The ring 60 provides a shoulder 63 which is separated from the annular portion 58 of the cylindrical slide member 55 when the member 55 abuts the retaining ring 56, and the second end 29 of the movable cylindrical core 30 is in engagement with the internal neck 14. If the movable cylindrical core 30 is withdrawn by supply of operating fluid to the inlet 50, the shoulder 63 comes to bear against the annular portion 58 and the movable cylindrical core 30 drives the cylindrical slide member 55. The member 55 is provided with a circular recess 64 enabling the balls 54 to retract radially when the recess is aligned with the balls 54 in the unlocking position of the slide member 55.

The mode of operation is clear from the description given above. In order to introduce the hollow cylindrical body 2 into the cylindrical receptacle 1, an operating fluid is supplied to the inlet 50 causing movement of slide member 55 to its unlocking position in which the balls 54 can be radially retracted. When the body 2 is in position in the cylindrical receptacle 1, supply of the operating fluid is cut off, and the compression springs 57 and 62 displace the cylindrical slide member 55 to bring it into the locking position, and displace the ring 60 to bring the second end 29 of the hollow cylindrical core 30 into engagement with the internal neck 14 and to open the valves 15, 16. It will be observed that failure of the supply of operating fluid may prevent the coupling of the two parts of the connector, but that once this coupling has been achieved it is no longer dependent on the operating fluid.

Uncoupling can be effected in two stages: in a first stage an operating fluid is supplied to the inlet 50 at a relatively low pressure, which is sufficient to compress the spring 62 and consequently to disengage the first end 29 of the movable cylindrical core 30 from the neck 14 and to reclose the non-return valves 15 and 16, but is insufficient to compress the spring 57 as well; after this first stage it is possible to check the tightness of the non-return valves 15 and 16; then, in a second stage, an operating fluid at a higher pressure is supplied to inlet 50 to simultaneously compress the springs 57 and 62 and move the slide member 55 to its unlocking position in which the balls 54 are radially retractable.

It will be observed that the magnitude of the pressure of the fluid supplied to the connection means 38 does not modify the behaviour of the movable cylindrical core 30 engaged in the neck 14, because, at its two ends, the core has the same transverse area subject to the pressure of the fluid but in opposite directions, so that compensation is achieved.

There is thus provided an automatically connectable and disconnectable hydraulic connector, which also permits the withdrawal of a compressed fluid from an apparatus, as well as the introduction of a compressed fluid into the apparatus.

It is obviously possible to make numerous modifications to the embodiment described above. Thus, the spring 62 may be replaced by a spring acting between the cylindrical slide member 55 and the ring 60; this spring would then be considerably less powerful than the spring 57. If it is not desired to withdraw fluid from the apparatus through the internal passages 13, 51, 40, that is to say, in cases where the apparatus 7 is an obturator, if it is not desired to deflate the latter, it is not necessary to provide the intermediate movable members 23 and 25. Verification of the tightness of the non-return valves 15 and 16 then does not require the installation of a spring 62 acting on the ring 60, since the latter can remain continuously applied against the annular portion 58 of the cylindrical slide member 55, or may even be connected to this slide member. In this case, the non-return valves 15 and 16 can be replaced by non-return valves disposed on the apparatus 7 itself. A single non-return valve in place of valves 15 and 16 may be considered sufficient in certain applications. The engagement of the movable cylindrical core 30 with the fixed cylindrical core 41 and with the neck 14 may be of the male or female type, depending on the arrangement adopted. The effective cross-sectional area of the movable cylindrical core 30 engaged is preferably the same at both ends.

It will be appreciated that many other modifications may be made to the construction of the above described hydraulic connector without departing from the scope of the invention.

What is claimed is:

1. An hydraulic connector for connecting an apparatus to an hydraulic pipe, comprising a first fixed part, means for connecting said first fixed part to the apparatus, first internal passage means provided in said first part and extending therethrough, a second retractable part having a first end and a second end, locking means carried by said second part for locking said second part to said first part, second internal passage means provided in said second part and having a first end at said first end of said second part and a second end at said second end of said second part, means for connecting said first end of said second passage means to the hydraulic pipe, said second end of said second passage means being adapted to be brought into communication with said first passage means, wherein said first part comprises a female cylindrical receptacle comprising an end piece provided with an axial neck directed inwardly of said receptacle and in part defining said first passage means, said second part comprises a hollow male cylindrical body for introduction into said receptacle, a cylindrical slide member is provided within said male body and is axially slidable therein, a main resilient member biasses said slide member in the direction of said second end of said second part and towards a locking position for locking said locking means, said male body comprises a movable hollow axial cylindrical core in part defining said second internal passage means and having a first axial end and a second axial end, fluid-tight engagement means provided at said second end of said movable core for engagement with said axial neck, an operating chamber associated with said first end of said movable core and adapted to receive operating fluid for causing axial displacement of said movable core in a disconnection direction from said second end of said second part towards the first end thereof, drive means provided on said second end of said movable core for driving said slide member, on displacement of said movable core in said disconnection direction, to cause said slide member to move from said locking position thereof.

2. An hydraulic connector according to claim 1, comprising an auxiliary resilient member axially biasing said movable core in a direction opposite to said disconnection direction and towards an advanced position in which said drive means are separated from said slide member and said slide member is in said locking position, and stop means for retaining said slide member against further movement in said opposite direction.

3. An hydraulic connector according to claim 2, wherein said main and said auxiliary resilient members comprise helicoidal compression strings disposed coaxially, said springs bearing against a cover disposed at said first end of said male body and one of said springs bearing against an annular portion of said slide member, and the other of said springs bearing against a ring carried by said movable core.

4. An hydraulic connector according to claim 3, wherein said ring is extended by a protective hood surrounding said second axial end of said movable cylindrical core.

5. An hydraulic connector according to claim 1, comprising at least a first non-return valve in said first internal passage means in said female receptacle, a first movable intermediate member associated with said first valve and disposed so as to be displaced by said second axial end of said movable core on engagement of said second axial end thereof with said axial neck so as to displace said first valve to the open position thereof.

6. An hydraulic connector according to claim 5, comprising a second non-return valve in said first internal passage means in said female receptacle, said second valve being disposed hydraulically in series with said first valve, and a second movable intermediate member connecting said first valve, in the open position thereof, to said second valve.

7. An hydraulic connector according to claim 1, wherein said male body comprises a fixed cylindrical core disposed axially thereof and provided with an internal axial duct forming part of said second passage means, and said first axial end of said movable core is sealingly and slidably engaged therewith.

8. An hydraulic connector according to claim 7, wherein the effective cross-sectional area of said movable core in engagement with said fixed core is substantially equal to the effective cross-sectional area of said movable cylindrical core in engagement with said axial neck.

* * * * *